Jan. 30, 1934.                E. B. HAMILTON                1,944,976
                              VACUUM GATHERER
                   Filed Feb. 26, 1932         2 Sheets-Sheet 1
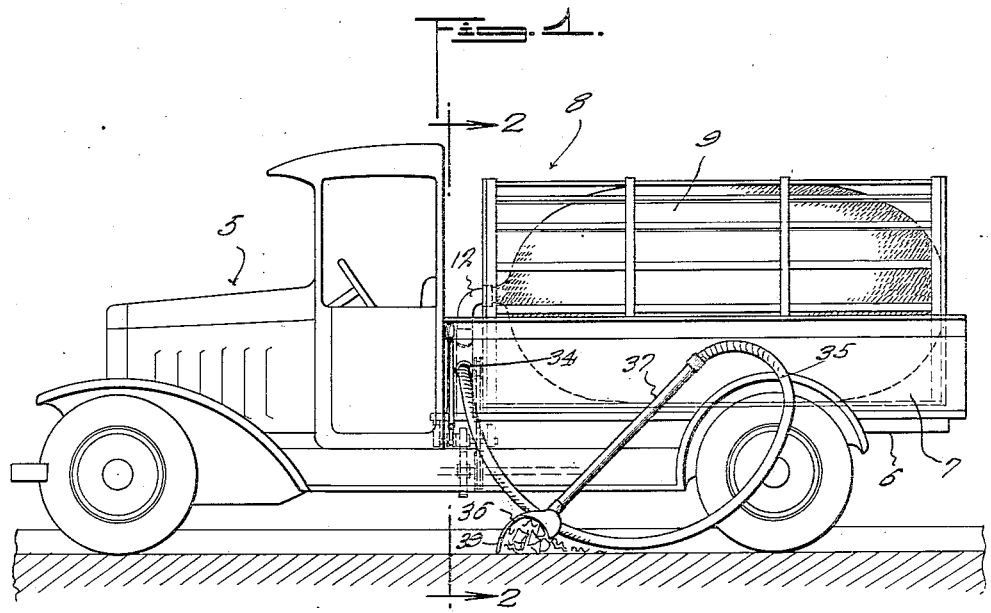
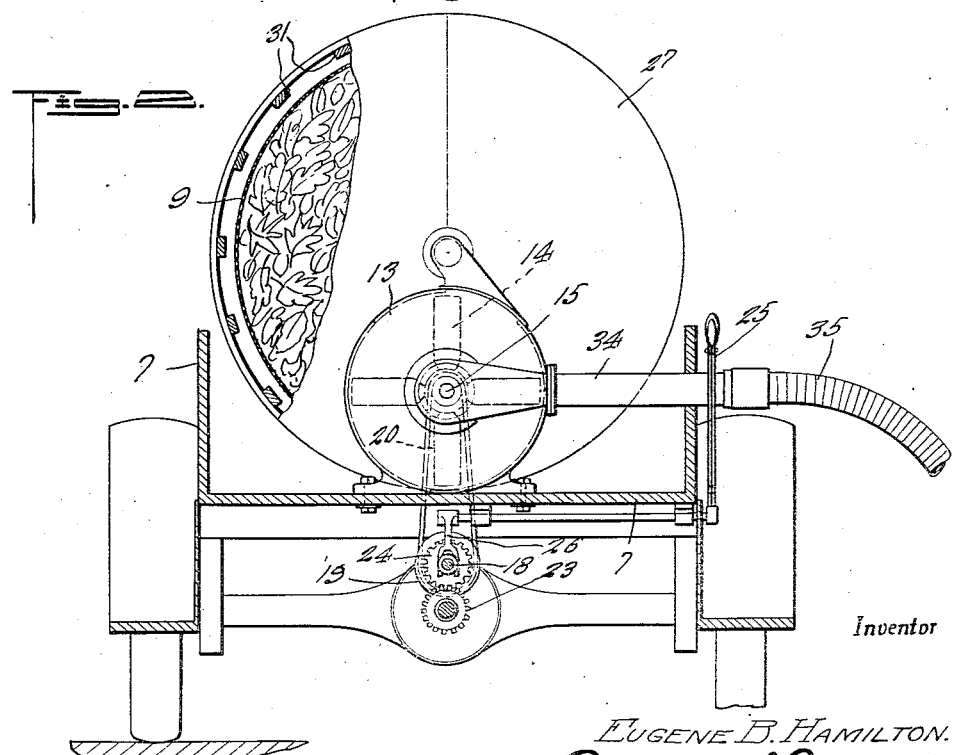
Inventor
EUGENE B. HAMILTON.
By Clarence A. O'Brien
                                              Attorney Jan. 30, 1934.  E. B. HAMILTON  1,944,976
VACUUM GATHERER
Filed Feb. 26, 1932  2 Sheets-Sheet 2
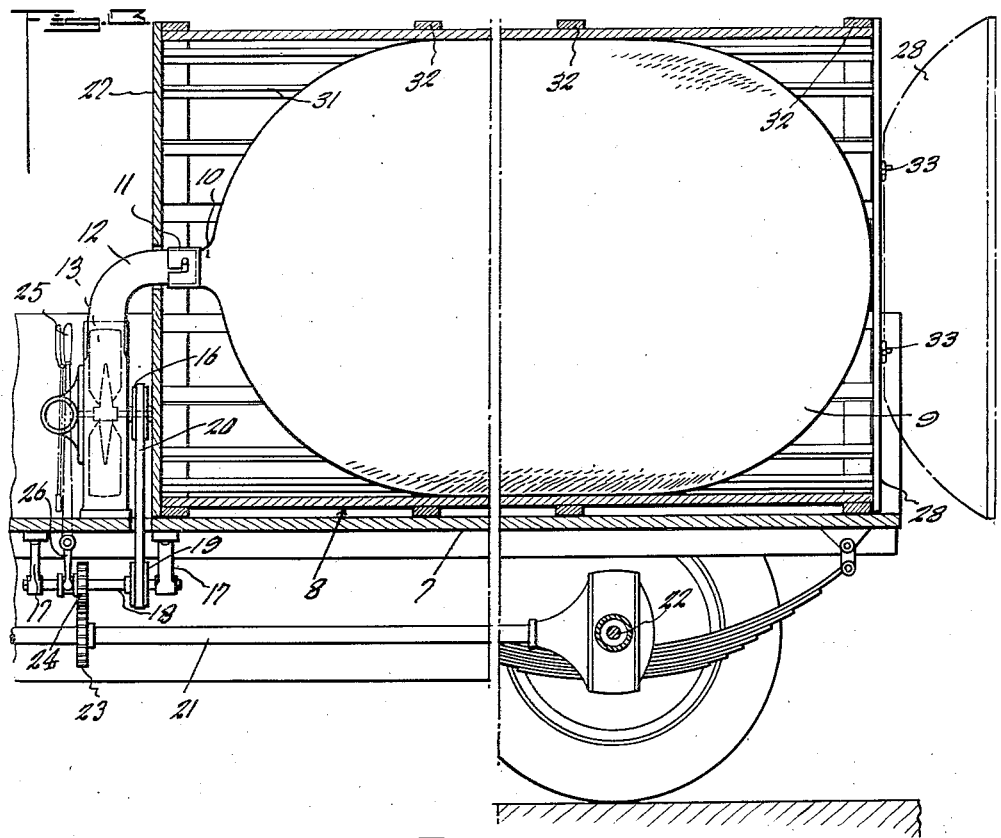
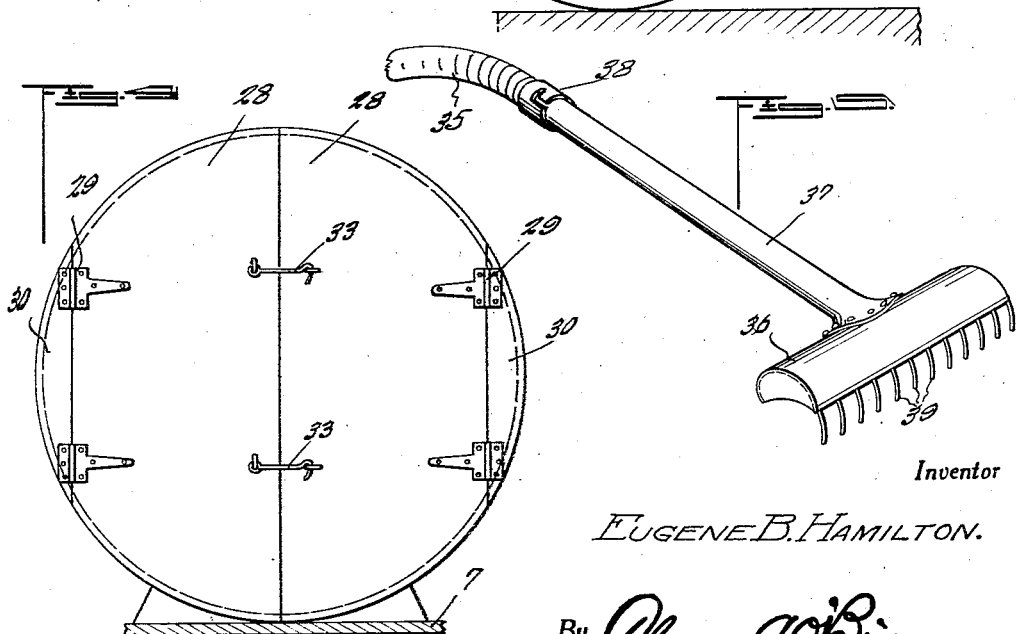
Inventor
EUGENE B. HAMILTON.
By Clarence A. O'Brien
Attorney Patented Jan. 30, 1934

1,944,976

UNITED STATES PATENT OFFICE 1,944,976

VACUUM GATHERER

Eugene B. Hamilton, Boston, Mass.

Application February 26, 1932. Serial No. 595,380

1 Claim. (Cl. 183—51)

This invention appertains to new and useful improvements in machines for gathering various articles from the ground such as leaves and various kinds of debris.

The principal object of this invention is to provide a machine for this purpose, which readily removes the leaves or other matter from a collection point, to the conveyor.

Still another important object of the invention is to provide a gatherer of the character described which employs vacuum for conveying material from a scattered position to a wheeled container.

These and other important objects and advantages of the invention will become apparent to the reader of the following specification.

In the drawings:—

Figure 1 is a side elevational view of the truck and gathering mechanism.

Fig. 2 represents a vertical sectional view taken substantially on line 2—2 of Fig. 1, showing part of the cage broken away.

Fig. 3 represents a longitudinal sectional view through a portion of the truck.

Fig. 4 represents a rear end elevational view of the cage.

Fig. 5 represents a fragmentary perspective view showing the gathering implement.

Referring to the drawings wherein like numerals designate like parts, it can be seen that numeral 5 generally refers to a truck of the wheeled type which is provided with the usual chassis frame 6 upon which the wagon body 7 is secured.

Disposed in this body and projecting well above the same is the cage generally referred to by numeral 8 for receiving the material receptacle or bag 9 which is of flexible material such as burlap or some other cheap material. This bag 9 has an inlet neck 10 which is coupled as at 11, detachably to the laterally disposed neck 12 of the suction fan housing 13, in which the suction fan 14 operates. The fan 14 is on the shaft 15 which carries a pulley 16.

Brackets 17—17 support a rotary shaft 18 on which is located the pulley 19 and trained over the pulleys 16 and 19 is the belt 20.

Numeral 21 represents the truck drive shaft to the rear axle 22, which has secured thereto a gear 23 meshing with a pinion 24 on the shaft 18. This shaft 21 is provided with the usual universal joint 21'.

Numeral 25 represents a rockable lever and detents operating a yoke 26 for shifting the gear 24 on the shaft 18, the gear 23 preferably being splined to the shaft 18. Thus, a drive is secured from the shaft 21 to the fan 14. However, the fan can be driven in various other ways without affecting the spirit of this invention.

The aforementioned cage 8 consists of a forward circular end wall 27 and a pair of rear door members 28—28, the door members being hinged-ly connected as at 29 to the side pieces 30. Extending rearwardly from the peripheral portion of the forward wall 27 are the slats 31 which are maintained at equal spaced intervals and in a cylindrical form by the hoops 32, one being located at the extreme rear ends of the slats. A suitable fastener or fasteners 33 is employed between the doors 28—28 at the rear of the cage 8.

Obviously by opening the doors 28—28 access may be had to the bag 9. Numeral 34 represents a pipe extension to the fan housing 31 to the outer end of which is secured the flexible conduit 35 leading from the shell 36, the shell 36 being provided with a tubular handle 37 which is detachably connected to the aforementioned conduit 35, as at 38.

The forward end portion of the shell 36 is provided with a plurality of depending rake teeth 39 while the bottom side of the shell 36 is open as shown in Fig. 1.

Obviously, leaves can be raked from scattered positions and as they are raked, they are sucked through the handle 37 and conduit 35 by way of the fan housing 13 to the bag 9.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

In a gathering machine of the class described, a horizontally arranged cage of cylindrical cross section and including a front end member having a centrally arranged opening therein, spaced slats having their front ends connected to said end member, a rear end member connected to the rear ends of said slats, said rear end member including a hoop encircling the rear ends of said slats and a pair of oppositely arranged narrow side members having an arcuate-shaped outer edge and a straight inner edge, the arcuate edges being connected with the hoop, said hoop and side members forming an opening, a pair of doors closing said opening and hinged to said side members and a bag of flexible material and of a mesh to permit air to pass therethrough, located in but disconnected from said cage and free to be removed therefrom when the doors are opened, said bag having rounded and closed ends with a tubular neck on the front end of the bag adapted to be connected to a conduit passing through the front opening of the cage and connected to a suction device.

EUGENE B. HAMILTON.